(12) United States Patent
Shchygel (10) Patent No.: US 9,086,895 B1
(45) Date of Patent: Jul. 21, 2015

(54) CONTROLLING HARDWARE DRIVER SELECTION

(71) Applicant: American Megatrends, Inc., Norcross, GA (US)

(72) Inventor: Artem Shchygel, Lawrenceville, GA (US)

(73) Assignee: American Megatrends Inc., Norcross, GA (US)

( * ) Notice: Subject to any disclaimer, the term of this patent is extended or adjusted under 35 U.S.C. 154(b) by 77 days.

(21) Appl. No.: 13/961,026

(22) Filed: Aug. 7, 2013

(51) Int. Cl.
*G06F 9/44* (2006.01)

(52) U.S. Cl.
CPC ............ *G06F 9/4411* (2013.01); *G06F 9/4401* (2013.01)

(58) Field of Classification Search
CPC .............................. G06F 9/4411; G06F 9/4401
USPC .......................... 713/1, 2; 710/104; 717/175
See application file for complete search history.

(56) References Cited

U.S. PATENT DOCUMENTS

| | | | |
|---|---|---|---|
| 2007/0022431 A1* | 1/2007 | Chang ............................ | 719/321 |
| 2010/0011379 A1* | 1/2010 | Xu et al. ........................ | 719/327 |
| 2011/0179261 A1* | 7/2011 | Tachibana ......................... | 713/2 |
| 2012/0297099 A1* | 11/2012 | Kochar et al. .................. | 710/104 |

OTHER PUBLICATIONS

Intel Platform Innovation Framework for EFI Compatibility Support Module Specification, Revision 0.97, Sep. 4, 2007 [online][retrieved on Aug. 6, 2013] retrieved from: http://www.intel.com/content/www/us/en/architecture-and-technology/unified-extensible-firmware-interface/efi-compatibility-support-module-specification-v097.html, pp. 3-19.

Unified Extensible Firmware Interface Specification, Version 2.3.1, Errata D, Apr. 2013, pp. 41-54, 174-178, 335-367 [online][retrieved on Aug. 6, 2013] retrieved from: http://www.uefi.org/specs/download/2_3_1_D.zip.

* cited by examiner

*Primary Examiner* — Stefan Stoynov
(74) *Attorney, Agent, or Firm* — Lee & Hayes, PLLC (57) ABSTRACT

Technologies are described herein for controlling the selection of drivers in a firmware environment for managing a hardware device based on a user preference. A user preference that specifies one driver being preferred over another driver for the hardware device is received, for example, through a user interface provided by the firmware environment. According to the user preference, a sorted driver pool that contain drivers available for the hardware device is created by listing the preferred driver before the non-preferred driver in the sorted driver pool. A driver stack is then built from the sorted driver pool by examining each driver in the sorted driver pool in the order they are listed in the sorted driver pool. The preferred driver is then put into the driver stack before the non-preferred driver and thus is associated with the hardware device first.

18 Claims, 7 Drawing Sheets

| PRIORITY | DRIVER SEARCH MECHANISM | APPLICABLE DRIVERS |
|---|---|---|
| HIGH | PLATFORM DRIVER OVERRIDE 710 | PLATFORM FIRMWARE DRIVERS (INCLUDING THUNK DRIVERS) AND OPTION ROM DRIVERS |
| MEDIUM | BUS SPECIFIC DRIVER OVERRIDE 720 | OPTION ROM DRIVERS |
| LOW | GENERAL DRIVER BINDING SEARCH 730 | PLATFORM FIRMWARE DRIVERS (INCLUDING THUNK DRIVERS) AND OPTION ROM DRIVERS |

*Fig. 7*

CONTROLLING HARDWARE DRIVER SELECTION

BACKGROUND

In many computing systems, low-level instruction code, or firmware, is used as an intermediary between the hardware components of the computing system and high-level software executing on the computing system, such as an operating system. The firmware provides a set of software routines that allow high-level software to interact with the hardware components of the computing system using standard calls. In some computer systems, the Basic Input/Output System ("BIOS") has been a de facto standard defining a firmware interface. The BIOS, however, is now being replaced by the more capable Extensible Firmware Interface ("EFI")-compatible firmware. EFI-compatible firmware may be configured according to a specification released by the Unified EFI ("UEFI") Forum (the "UEFI Specification"). Such a firmware may be referred to herein as a UEFI specification-compliant firmware or a UEFI firmware in short.

During the transition from the legacy/traditional BIOS firmware to UEFI firmware, a hardware device may include both a legacy/traditional BIOS option read-only memory ("ROM") and a UEFI option ROM. As known to those skilled in the art, the option ROM of a hardware device contains program code executable by the system, such as a driver that is used to connect and utilize the hardware device to the system once the option ROM is loaded. One of the reasons that a legacy BIOS option ROM may still exist on a hardware device may be that the device may need to boot a traditional operating system ("OS") in a UEFI environment, in which case, all the hardware devices need to include a traditional option ROM. Another reason is that a legacy driver provided in a legacy option ROM may be preferred over a UEFI driver (also called a UEFI native driver) because the legacy driver may have been proven to be more reliable than the UEFI native driver.

Current UEFI firmware does not include a mechanism to specify which of the drivers on the option ROM(s) may be connected to or used to manage a hardware device. Similarly, there may be scenarios where multiple alternative drivers may be available for managing the same hardware device. For example, in an INTEL RAID controller manufactured by INTEL CORPORATION, there may be an INTEL RAID driver provided by INTEL CORPORATION and also an LSI RAID driver provided by LSI CORPORATION. Some users may prefer the LSI RAID driver over the INTEL RAID driver when managing the RAID controller, while others may prefer the INTEL RAID driver over the LSI RAID driver. Thus, it would be convenient to enable the control of driver selection based on a user preference in a firmware environment.

It is with respect to these and other considerations that the disclosure made herein is presented.

SUMMARY

Technologies are described herein for controlling selection of drivers for managing a hardware device based on a user preference. Through the utilization of the technologies and concepts presented herein, functionality can be provided for allowing a user to choose a desired driver to manage a hardware device.

According to one aspect presented herein, a computer-implemented mechanism is disclosed for controlling driver selection for a hardware device in a firmware environment. In particular, a user preference may be received, for example, through a user interface provided by the firmware environment. The user preference may specify that one driver has a higher priority than, and thus is preferred over, another driver (the "non-preferred driver") for managing the hardware device. The preferred driver and the non-preferred driver may then be associated with the hardware device according to the user preference during a boot time of the firmware environment.

The association of the drivers with the hardware device may be realized by creating a sorted driver pool for the hardware device. The sorted driver pool may contain drivers that are available for the hardware device, and the preferred driver may be listed in the sorted driver pool before the non-preferred driver. A driver stack for the hardware device may be built based on the sorted driver pool by retrieving drivers capable of managing the hardware device from the sorted driver pool in an order in which drivers are listed in the sorted driver pool. The drivers in the driver stack may then be associated with the hardware device in an order in which they are added into the driver stack. Accordingly, the preferred driver may be added into the driver stack before the non-preferred driver, and thus may be associated with the hardware device first.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Embodiments of the disclosure presented herein provide methods, apparatuses, and computer-readable media for controlling driver selection for a hardware device in a firmware environment. In the following detailed description, references are made to the accompanying drawings that form a part hereof, and in which are shown by way of illustration specific embodiments or examples. Referring now to the drawings, in which like numerals represent like elements throughout the several figures, aspects of an exemplary operating environment and the implementations provided herein will be described.

Figure 1:
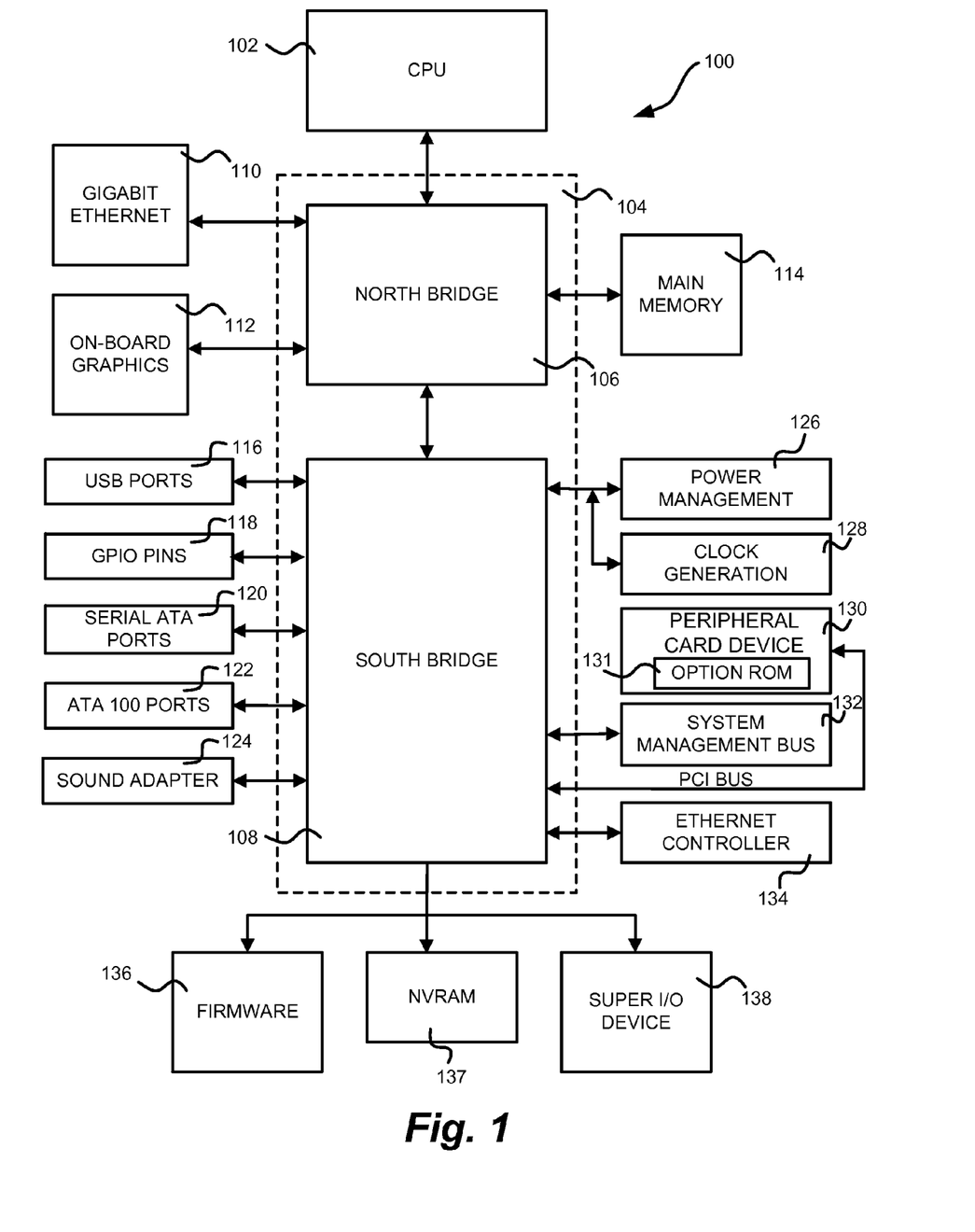
FIG. 1 is a computer architecture diagram that illustrates various components of a computing device that has been configured to provide the functionality disclosed herein for controlling driver selection for a hardware device.

FIG. 1 and the following discussion are intended to provide a brief, general description of a suitable computing environment in which embodiments presented herein may be implemented. While the embodiments presented herein are described in the general context of program modules that execute in conjunction with the execution of a computer firmware, those skilled in the art will recognize that various embodiments may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, embedded systems, and the like. Embodiments presented herein may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for practicing the embodiments discussed herein will be described. It should be appreciated that although the embodiments described herein are discussed in the context of a conventional desktop, laptop, or server computer, the embodiments may be utilized with virtually any type of computing device that utilizes a firmware to control aspects of its operation. FIG. 1 shows an illustrative computer architecture for a computer 100 that is operative to provide the functionality described herein for controlling driver selection for a hardware device that is connected to the computer 100.

In order to provide the functionality described herein, the computer 100 can include a baseboard, or motherboard. The motherboard can be a printed circuit board to which some or all of the components shown in FIG. 1 may be connected by way of a system bus or other electrical communication path. In one illustrative embodiment, the motherboard includes one or more central processing unit ("CPU") 102 configured to operate in conjunction with a chipset 104. The CPU 102 may be a standard central processor that performs arithmetic and logical operations necessary for the operation of the computer. For example, the CPU 102 might be a CPU available from INTEL CORPORATION, AMD CORPORATION, or a CPU based upon the ARM architecture from ARM HOLDINGS. Other types of CPUs might also be utilized.

In one implementation, the chipset 104 includes a northbridge 106 and a southbridge 108. The northbridge 106 provides an interface between the CPU 102 and the remainder of the computer 100. The northbridge 106 also provides an interface to a random access memory ("RAM") used as the main memory 114 in the computer 100 and, possibly, to an on-board graphics adapter 112. The northbridge 106 may also include functionality for providing networking functionality through a gigabit Ethernet adapter 110. The gigabit Ethernet adapter 110 is capable of connecting the computer 100 to another computer via a network. Connections that may be made by the Ethernet adapter 110 may include local area network ("LAN") or wide area network ("WAN") connections. LAN and WAN networking environments are commonplace in offices, enterprise-wide computer networks, intranets, and the Internet. The northbridge 106 is connected to the southbridge 108.

The southbridge 108 is responsible for controlling many of the input/output functions of the computer 100. In particular, the southbridge 108 may provide one or more universal serial bus ("USB") ports 116, a sound adapter 124, an Ethernet controller 134, and one or more general purpose input/output ("GPIO") pins 118. The southbridge 108 may also provide a system management bus 132 for use in managing the various components of the computer 100. Power management circuitry 126 and clock generation circuitry 128 may also be utilized during the operation of the southbridge 108.

The southbridge 108 may also provide a bus for interfacing peripheral card devices or add-in cards 130, such as a SCSI host bus adapter. In one embodiment, the bus comprises a peripheral component interconnect ("PCI") bus. It should be appreciated that other types of add-in cards compatible with other types of bus standards might also be utilized. The add-in card 130 might also include an option ROM 131. As known to those skilled in the art, the option ROM 131 of an add-in card 130 contains program code executable by the CPU 102, such as a driver that is used to connect the device to the system once the option ROM 131 is loaded.

The southbridge 108 is also operative to provide one or more interfaces for connecting mass storage devices to the computer 100. For instance, according to an embodiment, the southbridge 108 includes a serial advanced technology attachment ("SATA") adapter for providing one or more SATA ports 120 and an ATA100 adapter for providing one or more ATA100 ports 122. The SATA ports 120 and the ATA100 ports 122 may be, in turn, connected to one or more mass storage devices storing an operating system and application programs. As known to those skilled in the art, an operating system comprises a set of programs that control operations of a computer and allocation of resources. An application program is software that runs on top of the operating system software and uses computer resources made available through the operating system to perform application specific tasks desired by the user.

The mass storage devices connected to the southbridge 108 and the SCSI host bus adapter 130, and their associated computer-readable storage media, provide non-volatile storage for the computer 100. Although the description of computer-readable storage media contained herein refers to a mass storage device, such as a hard disk or CD-ROM drive, it should be appreciated by those skilled in the art that computer-readable storage media can be any available media that can be accessed by the computer 100. Computer storage media may include volatile and non-volatile, removable and non-removable media implemented in any method or technology for the non-transitory storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Encoding the program modules may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, and the like. For example, if the storage media are implemented as semiconductor-based memory, the program modules may transform the physical state of a semiconductor memory when the software or firmware is encoded therein. For example, the software may transform the state of transistors, capacitors, or other discrete circuit elements constituting the semiconductor memory.

As another example, the storage media may be implemented using magnetic or optical technology such as hard drives or optical drives. In such implementations, the program modules may transform the physical state of magnetic or optical media, when the software is encoded therein. These transformations may include altering the magnetic characteristics of particular locations within given magnetic media. These transformations may also include altering the physical features or characteristics of particular locations within given optical media to change the optical characteristics of those locations. It should be appreciated that various other transformations of physical media are possible without departing from the scope and spirit of the present description.

It should be appreciated that the program modules disclosed herein may include software instructions that, when loaded into the CPU 102 and executed, transform a general-purpose computing system into a special-purpose computing system customized to facilitate all, or part of, the operations disclosed herein. As detailed throughout this description, the program modules may provide various tools or techniques by which the computer 100 may participate within the overall systems or operating environments using the components, logic flows, and/or data structures discussed herein.

As shown in FIG. 1, a low pin count ("LPC") interface may also be provided by the southbridge 108 for connecting a "Super I/O" device 138. The Super I/O device 138 is responsible for providing a number of input/output ports, including a keyboard port, a mouse port, a serial interface, a parallel port, and other types of input/output ports. The LPC interface may also connect a computer storage media such as a ROM, EPROM, or a flash memory such as a non-volatile random access memory ("NVRAM") for storing the firmware 136 that includes program code containing the basic routines that help to start up the computer 100 and to transfer information between elements within the computer 100. In one embodiment, the firmware 136 is a firmware that is compatible with the UEFI Specification. The LPC interface may also be utilized to connect a NVRAM 137 to the computer 100. The NVRAM 137 may be utilized by the firmware 136 to store configuration data for the computer 100. The configuration data for the computer 100 may also be stored on the same NVRAM 137 as the firmware 136.

The computer 100 may be implemented as a conventional computer system, an embedded control computer, a laptop, or a server computer, a mobile device, a set-top box, a kiosk, a vehicular information system, a mobile telephone, a customized machine, or other hardware platform. The CPU 102 may be a general purpose processor, a processor core, a multiprocessor, a multi-core processor, a graphics processor, a digital signal processing ("DSP") processor, a customized computing device implemented within an application specific integrated circuit ("ASIC"), a customized computing device implemented within a field programmable gate array ("FPGA"), a customized computing device implemented within any type of programmable logic, a state machine, a reconfigurable processor, any other processing unit, or any combination or multiplicity thereof.

The CPU 102 may be constructed from any number of transistors or other circuit elements, which may individually or collectively assume any number of states. More specifically, the CPU 102 may operate as a state machine or finite-state machine. Such a machine may be transformed to a second machine, or a specific machine, by loading executable instructions contained within the program modules. These computer-executable instructions may transform the CPU 102 by specifying how the CPU 102 transitions between states, thereby transforming the transistors or other circuit elements constituting the CPU 102 from a first machine to a second machine, wherein the second machine may be specifically configured to perform the operations disclosed herein. The states of either machine may also be transformed by receiving input from one or more user input devices, network interfaces 110, 134, other peripherals, other interfaces, or one or more users or other actors. Either machine may also transform states, or various physical characteristics of various output devices such as printers, speakers, video displays, or otherwise.

It should be appreciated that the computer 100 may comprise other types of computing devices, including hand-held computers, embedded computer systems, personal digital assistants, and other types of computing devices known to those skilled in the art. It is also contemplated that the computer 100 may not include all of the components shown in FIG. 1, may include other components that are not explicitly shown in FIG. 1, or may utilize an architecture completely different than that shown in FIG. 1.

Figure 2:
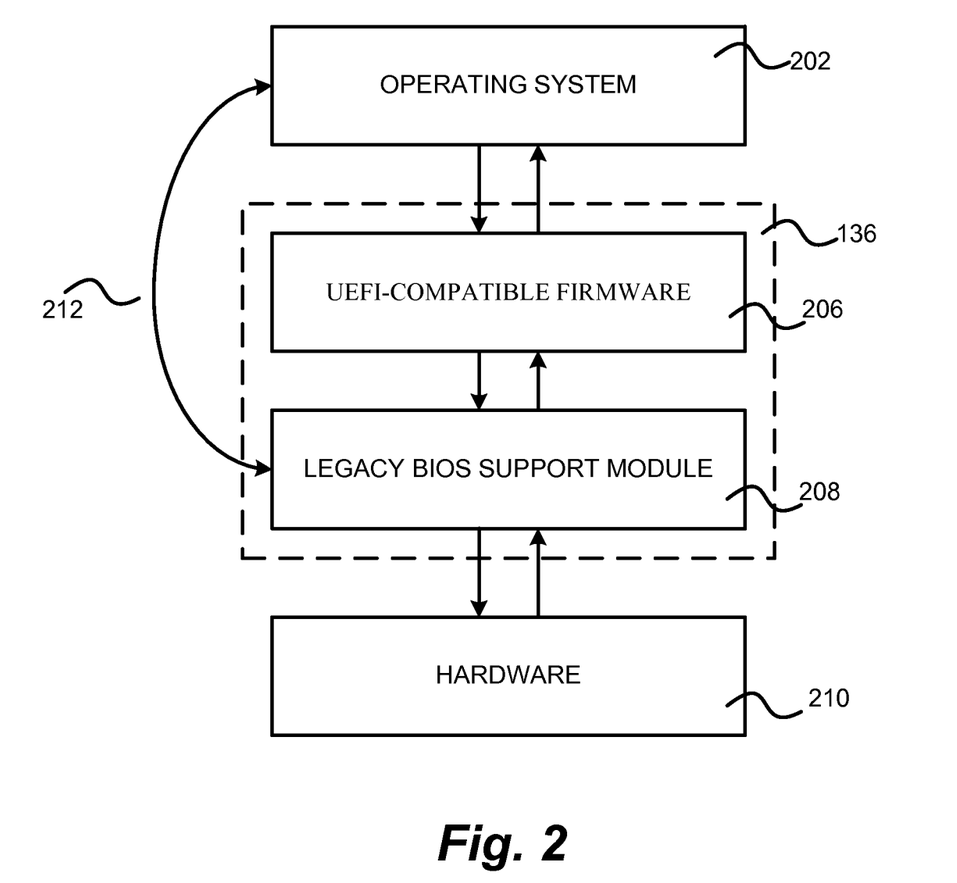
FIG. 2 is a block diagram illustrating aspects of an interface between a UEFI specification-compliant firmware and an operating system according to one or more embodiments presented herein.

Referring now to FIG. 2, a block diagram illustrates aspects of an interface between a UEFI firmware 136 and an operating system 202 according to one or more embodiments presented herein. As described with respect to FIG. 1, the firmware 136 may comprise a firmware compatible with the UEFI Specification (which may be referred to herein as the "Specification"). The term "UEFI Specification" used herein refers to both the EFI Specification developed by INTEL CORPORATION and the UEFI Specification managed by the UEFI FORUM. The UEFI Specification describes an interface between the operating system 202 and the system firmware 136. The UEFI Specification also defines an interface that platform firmware may implement, and an interface that the operating system 202 may use while booting. How the firmware 136 implements the interface may be left up to the manufacturer of the firmware. The Specification can define a way for the operating system 202 and firmware 136 to communicate information necessary to support the operating system boot process.

According to some embodiments, both a UEFI-compatible firmware 206 and a legacy BIOS support module 208 may be present in the UEFI firmware 136. This allows the computer 100 to support a UEFI firmware interface and a legacy BIOS firmware interface. In order to provide this functionality, an interface 212 may be provided for use by legacy operating systems and applications. According to other embodiments, only one of the UEFI-compatible firmware 206 and the legacy BIOS support module 208 may be present in the firmware 136. According to yet other embodiments, the firmware 136 may interface with the hardware 210 through any of various other architectures, components, or modules for the firmware without specific involvement of the UEFI-compatible firmware 206 or the legacy BIOS support module 208.

Additional details regarding the operation and architecture of a UEFI Specification compliant firmware can be found in the UEFI Specification which is available from INTEL COR- PORATION. INTEL CORPORATION has also provided further details regarding recommended implementation of EFI and UEFI in the form of The INTEL Platform Innovation Framework for EFI ("the Framework"). Unlike the UEFI Specification, which focuses only on programmatic interfaces for the interactions between the operating system and system firmware, the Framework is a group of specifications that together describe a firmware implementation that has been designed to perform the full range of operations that are required to initialize the platform from power on through transfer of control to the operating system. Both the UEFI Specification and the specifications that make up the Framework, which are also available from INTEL CORPORATION, are expressly incorporated herein by reference.

Figure 3:
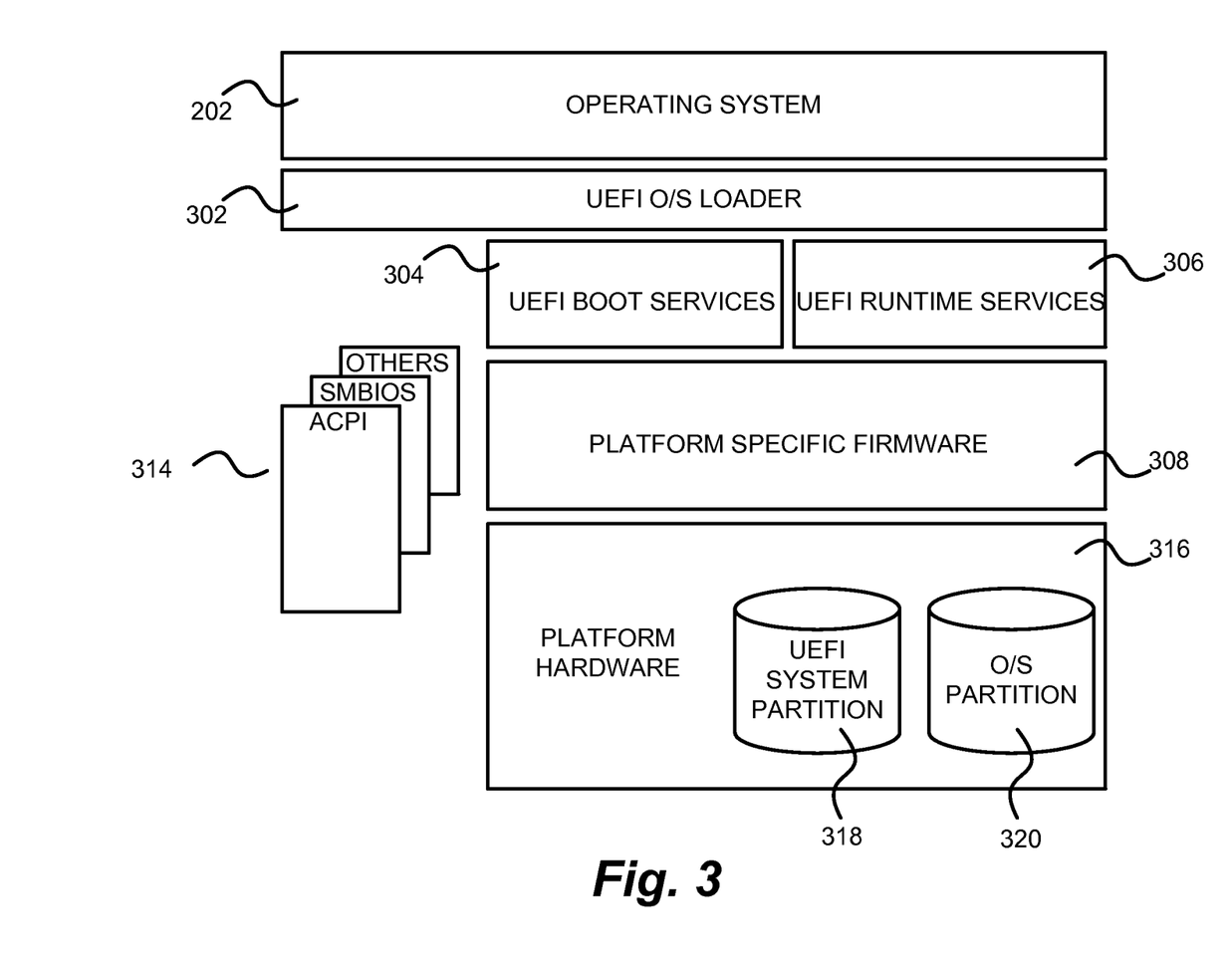
FIG. 3 is a block diagram illustrating an architecture for a UEFI specification-compliant firmware that provides an operating environment for one or more embodiments presented herein.

Turning now to FIG. 3, a block diagram illustrates the architecture for a UEFI specification-compliant firmware that provides an operating environment for one or more embodiments presented herein. As shown in FIG. 3, the architecture can include platform hardware 316 and an operating system 202. The platform specific firmware 308 may retrieve an operating system ("OS" or "O/S") image from the UEFI system partition 318 using an UEFI operating system loader 302. The UEFI system partition 318 may be an architecturally shareable system partition. As such, the UEFI system partition 318 can define a partition and file system designed to support safe sharing of mass storage between multiple vendors. An OS partition 320 may also be utilized.

Once started, the UEFI OS loader 302 may continue to boot the complete operating system 202. In doing so, the UEFI OS loader 302 may use UEFI boot services 304 and interface to other supported specifications to survey, comprehend, and initialize the various platform components and the operating system software that manages them. Thus, interfaces 314 from other specifications may also be present on the system. For example, the Advanced Configuration and Power Management Interface ("ACPI") and the System Management BIOS ("SMBIOS") specifications may be supported.

UEFI boot services 304 may provide interfaces for devices and system functionality used during boot time. UEFI runtime services 306 may also be available to the UEFI OS loader 302 during the boot phase. For example, a set of runtime services may be presented to ensure appropriate abstraction of base platform hardware resources used by the operating system 202 during its operation. UEFI allows extension of platform firmware by loading UEFI driver and UEFI application images which, when loaded, have access to UEFI-defined runtime and boot services.

Figure 4:
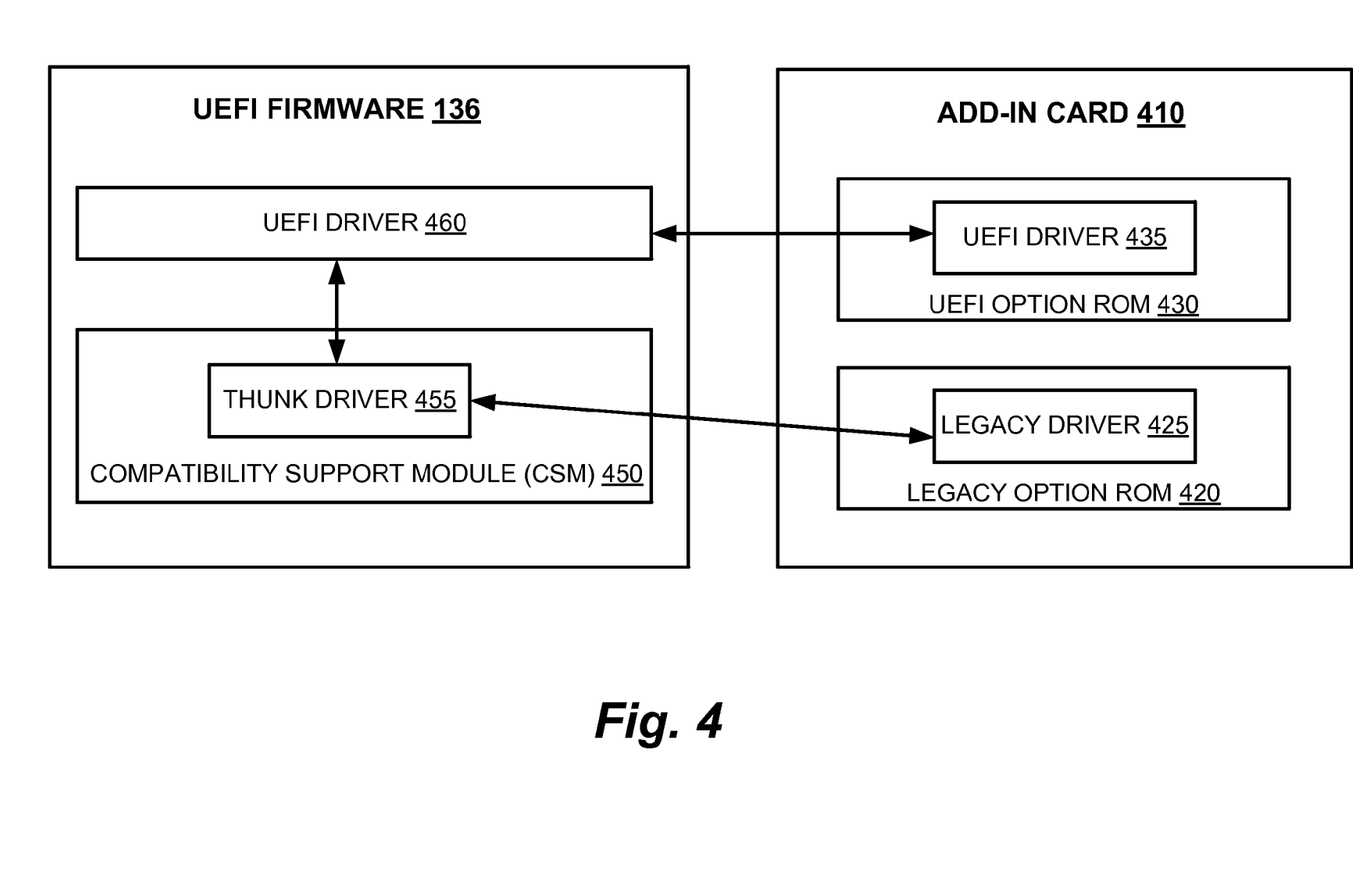
FIG. 4 is a block diagram showing illustrative interactions between drivers on option ROMs of an add-in card and a driver in UEFI firmware.

Referring now to FIG. 4, exemplary interactions between drivers on an option ROM of an add-in card 410 and drivers in the UEFI firmware 136 in a UEFI environment are illustrated. Examples of the add-in card 410 may include, but are not limited to, a video display adapter, a mass storage controller, a network card, or other types of add-in cards. The add-in card 410 shown in FIG. 4 may have a UEFI option ROM 430 storing a UEFI native driver 435 compatible with the UEFI Specification and a legacy option ROM 420 storing a legacy driver 425 that is compatible with the legacy BIOS specification.

FIG. 4 also shows the UEFI firmware 136 which may include drivers that are available and stored in the UEFI platform. In order to manage the add-in card 410, drivers from the UEFI firmware 136 and/or drivers from the option ROM(s) of the add-in card 410 may need to be associated with the add-in card 410 and may need to interact with each other. In one example where the add-in card 410 is a video graphic card, a UEFI display driver 460 in the UEFI firmware 136 may need to interact with an option ROM driver stored on the video graphic card to draw a character on the screen. If the option ROM driver is the UEFI native driver 435, the UEFI driver 460 in the UEFI firmware 136 can directly call the UEFI native driver 435. However, if the option ROM driver is the legacy driver 425, due to the incompatibility of the legacy driver with the UEFI environment, a mechanism may need to be implemented to address the incompatibility issue. Such a mechanism may be realized through the legacy BIOS support module 208.

In certain implementation of UEFI firmware, a Compatibility Support Module ("CSM") 450 is introduced in the legacy BIOS support module 208 to support the legacy driver in the UEFI environment. The CSM 450 provides compatibility support between the UEFI and traditional legacy BIOS code and allows booting a traditional OS or booting an UEFI OS off a device that requires a traditional option ROM. A thunk driver 455 is present in the CSM 450, which is code that switches from a 32-bit protected environment into the 16-bit realmode environment that is required for a legacy driver on a traditional option ROM to be executed. For each legacy driver 425 that needs to be executed in the UEFI environment, there may be a corresponding thunk driver 455. Therefore, when the legacy driver 425 needs to be executed in the UEFI environment, a corresponding thunk driver 455 may need to be associated with and launched for the add-in card 410.

FIG. 4 illustrates the UEFI driver 460 in the UEFI firmware 136 accessing the legacy driver 425 through a thunk driver 455. As discussed above, in order to execute the legacy driver 425, the UEFI driver 460 may need to call the thunk driver 455 first, which in turn may create the traditional environment for the legacy driver 425, execute the legacy driver 425, and return the results to the UEFI driver 460. As a result, controlling selection of drivers between the UEFI driver 435 and the legacy driver 425 for managing the add-in card 410 according to a user preference may be realized by controlling the selection of the thunk driver 455 for the legacy driver 425 and the UEFI native driver 435. Additional details regarding controlling selection of a UEFI native driver 435 and a thunk driver 455 corresponding to the legacy driver 425 will be provided below with regard to FIGS. 5-7.

Figure 5:
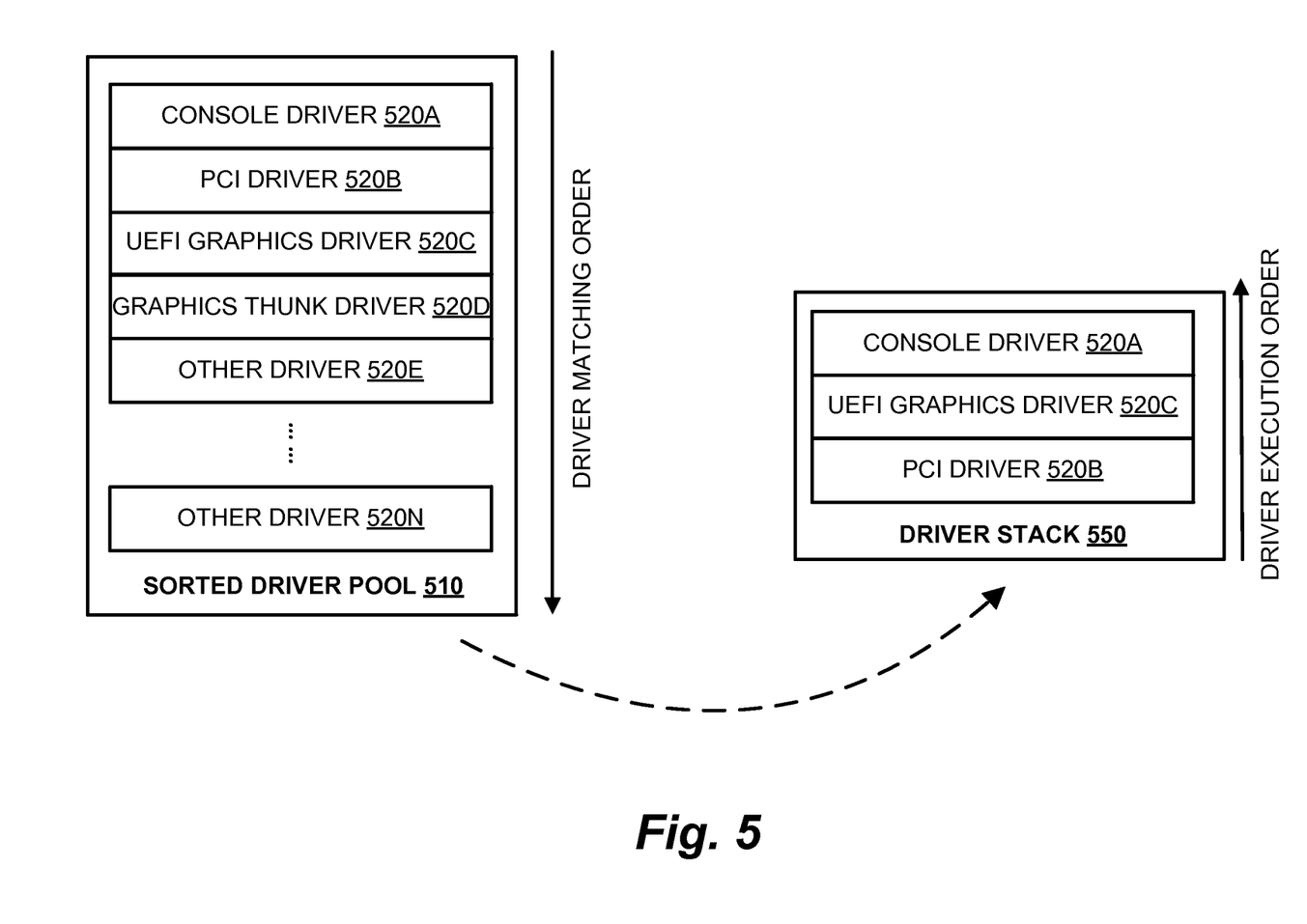
FIG. 5 is a block diagram illustrating a sorted driver pool for a hardware device and a driver stack built from the sorted driver pool for the hardware device.

FIG. 5 is a block diagram illustrating a sorted driver pool 510 for a hardware device, such as the add-in card 410, and a driver stack 550 built from the sorted driver pool 510 for the hardware device according to one embodiment disclosed herein. The driver stack 550 may include drivers that can be used to manage the hardware device. The order in which the drivers in the driver stack 550 are bound to the hardware device is also illustrated in FIG. 5. The order as shown in FIG. 5 is from bottom to top of the driver stack 550, because the drivers on top of the driver stack 550 may access the hardware device only via the drivers that are lower in the driver stack 550. Thus, the drivers that are lower in the driver stack 550 may need to be added to the driver stack 550 before the drivers on the top of the driver stack 550. While FIG. 5 shows that the driver stack 550 is built or ordered from bottom to top, it should be appreciated that other ways of building the driver stack might also be utilized in a similar fashion, such as from top to bottom. The embodiments described herein, therefore, should not be construed as limiting.

The driver stack 550 shown in FIG. 5 is an example driver stack for a video graphic add-in card 410. The driver stack 550 may include a PCI driver 520B as the lowest driver in the driver stack 550, a UEFI graphics driver 520C as the intermediate driver, and a console driver 520A as the top driver of the driver stack 550. The PCI driver 520B may be utilized to access the hardware device directly by reading and writing data from the device address space; the UEFI graphics driver 520C may be utilized to draw pixels on the screen via the PCI driver 520B; and the console output driver 520A may be utilized to draw symbols or characters, which may contain arrays of pixels, on the screen via the UEFI graphics driver 520C.

To generate the driver stack 550, each of the drivers in the driver stack 550 may be selected from a sorted driver pool 510 that is created for the hardware device. The sorted driver pool 510 may contain drivers that are available for the hardware device. The drivers in the sorted driver pool 510 may be examined and put into the driver stack 550 in the order in which the drivers are listed in the sorted driver pool 510. In the example illustrated in FIG. 5, the sorted driver pool 510 contains drivers available for the add-in video graphics card 410. The sorted driver pool may include, in the order in which the drivers are to be examined, a console driver 520A, a PCI driver 520B, a UEFI graphic driver 520C, a graphics thunk driver 520D and other drivers 520E-520N. The graphics thunk driver 520D may be used for enabling an execution of a legacy graphics driver in an option ROM of the video graphics card 410.

The sorted driver pool 510 may be used to build the driver stack 550 for the video graphic card 410. The drivers in the sorted driver pool 510 may be looped through to find drivers that can be utilized to manage the hardware device 410 based on the drivers that have already been put in the driver stack 550. According to the order in which the drivers are listed in the sorted driver pool 510 shown in FIG. 5, the console driver 520A may be examined first. Since the console driver 520A cannot directly access or manage the hardware device, it will not be added to the driver stack 550 and the next driver listed in the sorted driver pool 510, the PCI driver 520B, may be examined. As mentioned before, the PCI driver 520B may be used to access the video graphic card 410 directly, and thus, it will be added to the driver stack 550 first.

Once a successful driver has been found for the hardware device, the driver may be removed from the sorted driver pool 510, and the current examination loop may break. A new loop may start again from the beginning of the sorted driver pool 510 to search for drivers that may be added to the driver stack 550. Thus, in the new loop, the console driver 520A may again be examined first, but will not be added to the driver stack 550 because it still cannot manage the video graphic card 410 even through the PCI driver 520B that has already been added in the driver stack 550. Next, the UEFI graphics driver 520C may be examined and then be added into the driver stack 550 since it can be utilized to draw pixels on the screen via the PCI driver 520B.

Once the UEFI graphics driver 520C is added into the driver stack 550, it may be removed from the sorted driver pool 510 and another new loop of driver examination starts. This time, the console driver 520A, which may be examined first again, may be added to the driver stack 550 since it can manage the video graphic card 410 via the UEFI graphics driver 520C that has already been added into the driver stack 550. Another new loop of examination may start with the graphic thunk driver 520D, which may fail to be added to the driver stack 550 since the video graphic card 410 has already been managed by the UEFI graphics driver 520C at the intermediate level. The next driver in the sorted driver pool 510 may then be examined. The above process continues until all the drivers in the sorted pool are examined.

In the above example, it is the UEFI graphics driver 520C, rather than the graphics thunk driver 520D, that is added to the driver stack 550 and will be utilized to manage the video graphic card 410. This is because the UEFI graphics driver 520C is listed in the sorted driver pool 510 before the graphics thunk driver 520D. If the graphic thunk driver 520D was listed in the sorted driver pool 510 before the UEFI graphics driver 520C, the graphic thunk driver 520D and thus the corresponding legacy graphic driver would be added to the driver stack 550 to manage the video graphic card 410. As can be seen, controlling selection of a driver to manage a hardware device based on a user preference may be realized through controlling the order of the drivers appearing in the sorted driver pool 510. Additional details regarding such a process will be provided below with regard to FIG. 6.

Figure 6:
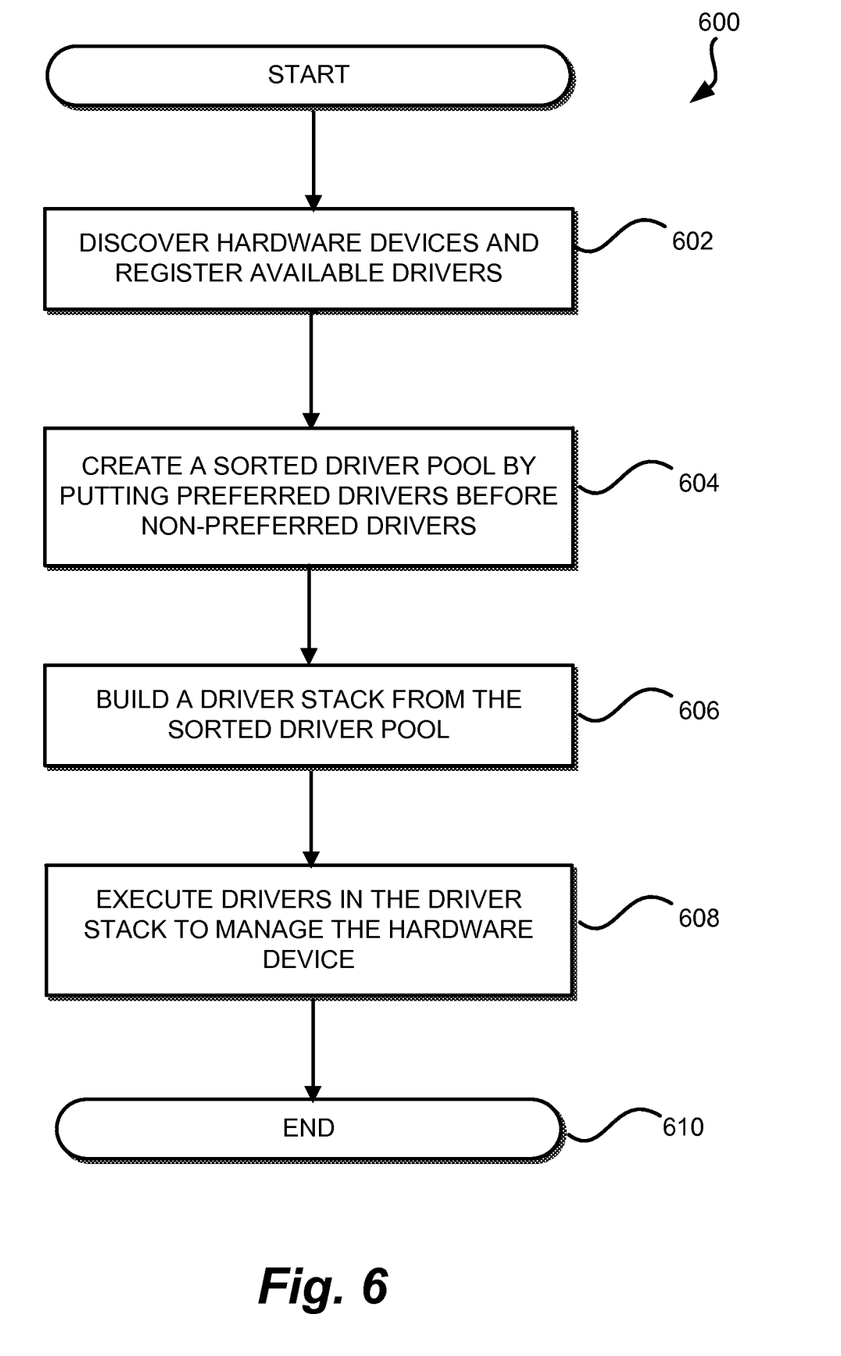
FIG. 6 is a flow diagram showing an illustrative process for controlling driver selection for a hardware device according to one embodiment disclosed herein.

FIG. 6 is a flow diagram showing a routine 600 that illustrates aspects of a process for controlling driver selection for a hardware device according to one embodiment disclosed herein. The process illustrated in FIG. 6 may be performed by various components that make up the UEFI firmware 136 shown in FIG. 2.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

The routine 600 begins at operation 602, where hardware devices are discovered and available drivers are registered. According to embodiments, all available drivers may be stored in UEFI firmware 136, except for drivers on add-in cards. UEFI firmware 136 may be organized as sets of Firmware Volumes ("FV"), each FV containing Firmware Files ("FFS"). At the beginning of the boot sequence, all FVs may be discovered and stored within internal structure for further processing.

During the Driver eXecution Environment ("DXE") phase of the UEFI firmware 136, the discovered and registered FVs may be processed, and each FFS within the processed FV may execute and get control via UEFI boot services 304, such as LoadImage( ) and StartImage( ). During the execution of FFS, available drivers may be registered within the system for further access. For example, the CSM 450 may reside in its dedicated FFS. Once that FFS gets control via UEFI boot services 304, the CSM 450 may register one or more thunk drivers. There may also be platform-specific FFS within the generic FV, which may publish platform-specific drivers using the approach discussed above.

Drivers that are stored in an add-in card 410 may be retrieved by, for example, a PCI bus driver residing in the UEFI firmware 136, once the add-on card 410 is discovered. Hardware discovery may be performed in a Boot Device Selection ("BDS") phase. According to embodiments, the PCI bus driver may scan designated PCI address spaces, and write/read data to seek for responses. Once a response is received, which means some hardware has been discovered, additional data may then be read to determine information about the hardware, such as hardware type, capabilities etc.

For discovered hardware devices, the PCI bus driver may read the device firmware, load the device firmware into memory and call UEFI boot services 304, such as LoadImage( ) and StartImage( ) to execute the loaded firmware.

During the execution of the device firmware, drivers on the add-in card may be registered in the system for further access. Once hardware devices have been discovered and all the available drivers have been registered, the routine 600 proceeds from operation 602 to operation 604.

At operation 604, a sorted driver pool 510 may be created for a hardware device according to a user preference. The user preference may specify a preferred driver to manage a hardware device, and the alternative driver(s) may be disabled from managing the hardware device or be used as fallback driver(s). The user preference may be received from a user through a user interface presented by the UEFI firmware 136, or through other mechanisms. As discussed above, the earlier a driver appears in the sorted driver pool 510, the earlier it is examined for compatibility with the hardware device. If the examination is successful, the driver may get associated with the hardware device earlier than other alternative drivers. Thus, the sorted driver pool 510 may be built such that the preferred driver as specified in the user preference is listed in the sorted driver pool 510 before the non-preferred driver(s). Additional details regarding building sorted driver pool 510 will be provided below with regard to FIG. 7. The routine 600 then proceeds to operation 606.

At operation 606, a driver stack 550 may be built for the hardware device from the sorted driver pool 510 according to the process described above with respect to FIG. 5. At operation 608, the drivers in the driver stack 550 may then be utilized to manage the hardware device. From operation 608, the routine 600 proceeds to operation 610, where it ends.

Figure 7:
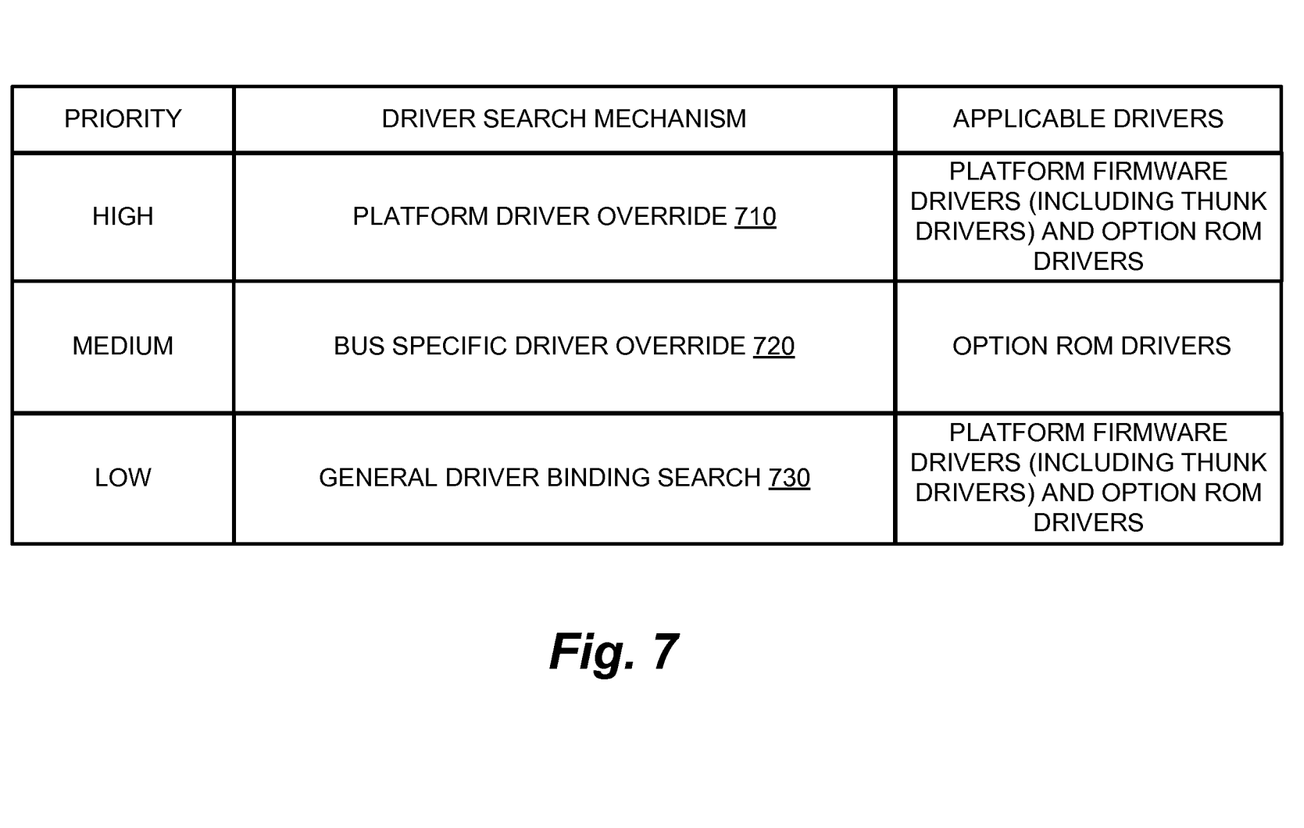
FIG. 7 is a table listing various driver search mechanisms in a UEFI environment.

FIG. 7 lists various driver search mechanisms in a UEFI environment that may be utilized to retrieve drivers to build the sorted driver pool 510 according to an embodiment disclosed herein. In the UEFI environment, there are three mechanisms that may be utilized to build the sorted driver pool 510, each with a different priority, namely, platform driver override 710, bus specific driver override 720, and general driver binding search 730. In the platform driver override mechanism 710, which has the highest priority among the three mechanisms, a platform_driver_override protocol may be called by the system to return drivers that are available for the hardware device. This protocol may be produced by a platform driver. The drivers that can be accessed and returned by this protocol include the drivers provided in the UEFI firmware 136. In various implementations, drivers from the option ROM of add-in cards may also be returned through this mechanism, for example, by utilizing the bus specific driver override mechanism 720 within the platform driver override mechanism 710.

The bus specific driver override mechanism 720 has a priority lower than the platform driver override 710, but higher than the general driver binding search 730. Through this mechanism, the system may call a bus_specific_driver_override protocol to return drivers that may be further examined for the hardware device. This protocol may be produced by the bus driver that discovers hardware devices. As discussed above, during the discovery of hardware devices, the bus driver may read firmware from add-in cards which in turn may register drivers located in the firmware of add-in cards. Thus, the bus driver may have knowledge of those drivers and may returned those drivers for creating the sorted driver pool 510 via the bus_specific_driver_override protocol. As a result, the drivers that reside in the option ROM of the add-in cards may be listed in the sorted driver pool 510 earlier than any regular driver stored in the platform firmware 136 except for those explicitly returned via platform_driver_override protocol using the platform driver override mechanism 710.

The one with the lowest priority among the three mechanisms listed in FIG. 7 is general driver binding search 730. The general driver binding search 730 may access drivers from all the registered drivers in the platform, including the thunk drivers and drivers in the option ROM of add-in cards that have been registered, and return drivers available for the hardware device to add into the sorted driver pool 510.

In one embodiment, no driver can be added to the sorted driver pool 510 more than once. For example, if a driver was added in the sorted driver pool 510 by the platform driver override mechanism 710 or the bus specific driver override mechanism 720, it will not be added again by the general driver binding search mechanism 730. In one implementation, any driver that has been returned by a driver search mechanism will be removed from the list of drivers returned by another driver binding search mechanism having a lower priority before adding to the sorted driver pool 510.

According to embodiments, the different levels of priority of these three mechanisms provided by the UEFI environment may be utilized to create a sorted driver pool 510 that can satisfy a user preference on the driver selection for managing a hardware device. In one embodiment, the platform driver override 710 and/or the bus specific driver override 720 may be utilized to list preferred drivers in the sorted driver pool 510 before the non-preferred drivers. Detailed implementations of the embodiment may be different depending on the type of drivers and their properties.

In the scenario where a user may choose between a legacy option ROM driver 425 and a UEFI native driver to manage a hardware device, the property of the thunk driver that is used to execute the legacy driver 425 may be utilized to identify the preferred or the non-preferred driver in platform driver override mechanism 710. Different from other drivers, each registered thunk driver may have a ThunkFlag associated with it. Thus, the ThunkFlag may be utilized to distinguish the thunk drivers from other drivers. The platform_driver_override protocol may utilize this property of thunk drivers to retrieve the preferred driver according to the user preference.

For example, a user has indicated in the user preference that when managing the add-in card 410, the legacy option ROM driver 425 is preferred over a UEFI native driver. In order to allow the preferred legacy option ROM driver 425 to manage the add-in card 410, a specific version of platform_driver_override protocol may be created. This version of platform_driver_override protocol may identify the thunk driver 455 corresponding to the legacy driver 425 by recognizing the ThunkFlag of the thunk driver 455. The identified thunk driver 455 may be first returned and listed in the sorted driver pool 510 before the alternative non-preferred UEFI native driver. As such, as discussed above, the thunk driver 455, and thus the legacy driver 425, may be examined first and get associated with the add-in card 410 before the alternative UEFI native driver.

If, on the other hand, the user prefers the option ROM UEFI native driver 435 to manage the add-in card 410, rather than the legacy driver 425, the ThunkFlag may still be utilized. In this scenario, the thunk driver 455 may need to be listed in the sorted driver pool 510 after the option ROM UEFI native driver 435. The option ROM UEFI native driver 435 may be retrieved by the bus specific driver override 720, which has a higher priority than the general driver binding search 730. If the thunk driver 455 can be retrieved by the general driver binding search 730, the desired order of drivers in the sorted driver pool 510 would be achieved. In one embodiment, this may be realized by implementing a platform_driver_override protocol in platform driver override 710 which may recognize thunk drivers via the ThunkFlag, and not return any of the thunk drivers. As a result, no thunk drivers may be returned by the high priority platform driver override 710. The preferred option ROM UEFI native driver 425 may then be listed in the sorted driver pool 510 by the medium priority bus specific driver override 720, and the non-preferred thunk driver 455 may be returned and added to the sorted driver pool 510 by the low priority general driver binding search 730 after the option ROM UEFI native driver 425.

In different situations, a user may prefer a UEFI native driver residing in the UEFI firmware 136 over the legacy driver 425 to manage the add-in card 410. In this scenario, the preferred UEFI native driver cannot be returned by the bus specific driver override 720, and instead the platform driver override mechanism 710 may be utilized to achieve the desired driver selection. According to one embodiment, a specific version of platform_driver_override protocol may be created to identify, by recognizing the ThunkFlags of the thunk drivers, and return the thunk drivers after all of the identified UEFI drivers have been returned. In this way, the thunk drivers may only be listed in the sorted driver pool after all identified UEFI drivers, including the desired UEFI native driver. In another embodiment, the platform_driver_override protocol may return only UEFI drivers, but not to return the thunk drivers. The actual retrieval of these thunk drivers may be performed by the general driver binding search 730. In either embodiment, the preferred UEFI native driver would be listed in the sorted driver pool before the thunk driver 455, and thus may be examined and associated with the hardware device first.

While FIGS. 5-7 primarily disclose controlling the driver selection between a legacy option ROM driver and a UEFI native driver, it should be appreciated that controlling the selection of other types of drivers might also be achieved in a similar fashion. For example, the set of drivers that a user may choose from for managing a hardware device may not involve a legacy option ROM driver 425. Thus, the ThunkFlags associated with the thunk drivers for the legacy option ROM drivers may not be available for distinguishing the preferred driver from non-preferred drivers. In this scenario, an identification of the driver, such as FFS file name, may be utilized to distinguish different drivers according to one embodiment disclosed herein. By way of example, and not limitation, the filename of the preferred driver may be added into a preferred driver identification list. The platform_driver_override protocol may check the identification list each time it finds an available driver. The platform_driver_override protocol may return the driver first if the filename of the driver is listed in the identification list, or otherwise may return the driver until all the preferred drivers have been returned or not return the driver. As a result, the preferred driver may be added into the sorted driver pool 510, be examined and associated with the hardware device before the non-preferred driver(s).

In the scenarios discussed above, although the non-preferred driver may not be the first choice of the user when managing the hardware device, it may still be added into the sorted driver pool 510 and may serve as a fallback driver when the preferred driver fails to manage the hardware. However, there may be scenarios when the user may explicitly request to disable the non-preferred driver in the user preference. To disable a non-preferred driver, such as an option ROM driver, a bus driver may be utilized to prevent the execution of the non-preferred driver. In one implementation, the bus driver may check the current platform policy and prevent the option ROM driver from being registered by the option ROM firmware.

If the driver to be disabled is a legacy option ROM driver, the CSM driver may be utilized according to one embodiment disclosed herein. Before launching a legacy option ROM driver, the CSM driver may check a parameter value defined in a proprietary protocol that indicates whether to launch the legacy option ROM driver. If the parameter indicates that the legacy option ROM driver should not be launched, the CSM driver will prevent the launch of the legacy option ROM driver. An un-launched legacy option ROM driver would not provide any functionality to the corresponding thunk driver and thus may be considered as disabled from the system point of view. Various other ways to disable a non-preferred driver may be utilized, such as checking the FFS file name of the driver to determine if the driver may be launched or not.

It should be appreciated that the add-in card 410 described above is provided by way of example only, and should not be construed as limiting. The same technologies apply to other hardware devices as well, such as on-board cards. It should also be appreciated that while the subject matter presented herein has been described in conjunction with UEFI environment, it is to be understood that the embodiments are not necessarily limited to the UEFI environment. Similar embodiments may be utilized in other firmware environments, such as the OPEN FIRMWARE specification from SUN MICROSYSTEMS or another type of open or proprietary firmware.

Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

I claim:

1. A computer-implemented method for controlling driver selection for a hardware device in a firmware environment, the method comprising:
    receiving a user preference specifying a first driver having a higher priority than a second driver for the hardware device;
    creating a sorted driver pool for the hardware device, the sorted driver pool comprising drivers that are available for the hardware device, wherein the first driver is listed in the sorted driver pool before the second driver;
    building a driver stack for the hardware device based on the sorted driver pool by retrieving drivers that are capable of managing the hardware device from the sorted driver pool in an order in which drivers are listed in the sorted driver pool, wherein the first driver is put in the driver stack before the second driver is put in the driver stack; and
    associating the drivers in the driver stack with the hardware device during a boot time of the firmware environment.

2. The method of claim 1, wherein the firmware environment is a unified extensible firmware interface ("UEFI") environment.

3. The method of claim 2, wherein the first driver is a thunk driver for enabling a legacy option read-only memory ("ROM") driver to execute in the UEFI environment, and the second driver is a UEFI driver.

4. The method of claim 3, wherein creating the sorted driver pool for the hardware comprises:
  prior to retrieving the UEFI driver for the sorted driver pool, retrieving and adding the thunk driver into the sorted driver pool using a platform driver override protocol; and
  retrieving and adding the UEFI driver into the sorted driver pool.

5. The method of claim 4, wherein the UEFI driver is a UEFI option ROM driver, and wherein retrieving the UEFI driver comprises retrieving the UEFI driver using a bus specific driver override protocol.

6. The method of claim 2, wherein the first driver is a UEFI driver and the second driver is a thunk driver.

7. The method of claim 6, wherein the UEFI driver is a UEFI firmware driver, and wherein creating the sorted driver pool for the hardware comprises:
  prior to retrieving the thunk driver for the sorted driver pool, retrieving and adding the UEFI driver into the sorted driver pool using a platform override protocol; and
  retrieving and adding the thunk driver into the sorted driver pool.

8. The method of claim 6, wherein the UEFI driver is a UEFI option ROM driver, and wherein creating the sorted driver pool for the hardware comprises:
  prior to retrieving the thunk driver for the sorted driver pool, retrieving and adding the UEFI driver into the sorted driver pool using a bus specific driver override protocol; and
  retrieving and adding the thunk driver into the sorted driver pool.

9. A non-transitory computer-readable storage medium having computer-executable instructions stored thereupon which, when executed by a computer, cause the computer to:
  receive a user preference specifying a first driver having a higher priority than a second driver for a hardware of the computer;
  create a sorted driver pool for the hardware, the sorted driver pool comprising drivers that are available for the hardware, wherein the first driver is listed in the sorted driver pool before the second driver;
  build a driver stack for the hardware based on the sorted driver pool by retrieving drivers that are capable of managing the hardware from the sorted driver pool in an order in which drivers are listed in the sorted driver pool, wherein the first driver is put in the driver stack before the second driver is put in the driver stack; and
  associate the drivers in the driver stack with the hardware during a boot time of a unified extensible firmware interface ("UEFI") environment of the computer.

10. The computer-readable storage medium of claim 9, wherein the first driver is a thunk driver for enabling a legacy option read-only memory ("option ROM") driver to execute in the UEFI environment, and the second driver is a UEFI driver.

11. The computer-readable storage medium of claim 10, wherein creating the sorted driver pool for the hardware comprises:
  prior to retrieving the UEFI driver for the sorted driver pool, retrieving and adding the thunk driver into the sorted driver pool using a platform driver override protocol; and
  retrieving and adding the UEFI driver into the sorted driver pool.

12. The computer-readable storage medium of claim 11, wherein the UEFI driver is a UEFI option ROM driver, and wherein retrieving the UEFI driver comprises retrieving the UEFI driver using a bus specific driver override protocol.

13. The computer-readable storage medium of claim 9, wherein the first driver is a UEFI driver and the second driver is a thunk driver.

14. The computer-readable storage medium of claim 13, wherein the UEFI driver is a UEFI option ROM driver, and wherein creating the sorted driver pool for the hardware comprises:
  prior to retrieving the thunk driver for the sorted driver pool, retrieving and adding the UEFI driver into the sorted driver pool using a bus specific driver override protocol; and
  retrieving and adding the thunk driver into the sorted driver pool.

15. The computer-readable storage medium of claim 9, wherein creating the sorted driver pool for the hardware comprises:
  adding an identification of the first driver into a preferred driver identification list;
  prior to retrieving the second driver for the sorted driver pool, retrieving and adding the first driver into the sorted driver pool using a platform driver override protocol based on the preferred driver identification list; and
  retrieving and adding the second driver into the sorted driver pool.

16. An apparatus comprising:
  a central processing unit (CPU); and
  a non-volatile memory storing a UEFI-compliant firmware which, when executed by the CPU, will cause the CPU to
  create a sorted driver pool for a hardware device of the apparatus, the sorted driver pool comprising drivers that are available for the hardware device, wherein a first driver is listed in the sorted driver pool using a platform override protocol before a second driver according to a user preference specifying the first driver having a higher priority than the second driver for the hardware;
  build a driver stack for the hardware based on the sorted driver pool by retrieving drivers that are capable of managing the hardware from the sorted driver pool in an order in which drivers are listed in the sorted driver pool, wherein the first driver is put in the driver stack before the second driver is put in the driver stack; and
  associate the drivers in the driver stack with the hardware.

17. The apparatus of claim 16, wherein the first driver is a thunk driver for enabling a legacy option read-only memory ("option ROM") driver to execute in the UEFI environment, and the second driver is a UEFI option ROM driver; and wherein the UEFI-compliant firmware will further cause the CPU to
  retrieve and add the thunk driver into the sorted driver pool using the platform driver override protocol; and
  retrieve and add the UEFI option ROM driver into the sorted driver pool using a bus specific driver override protocol.

18. The apparatus of claim 16, wherein the first driver is a UEFI option ROM driver, and the second driver is a thunk driver; and wherein the UEFI-compliant firmware will further cause the CPU to
  prior to retrieving the thunk driver for the sorted driver pool, retrieve and add the UEFI option ROM driver into the sorted driver pool using a bus specific driver override protocol; and
  retrieve and add the thunk driver into the sorted driver pool.

* * * * *